US009684956B2

(12) United States Patent
Liao et al.

(10) Patent No.: US 9,684,956 B2
(45) Date of Patent: Jun. 20, 2017

(54) ARRANGEMENT AND METHOD FOR DETERMINING A BODY CONDITION SCORE OF AN ANIMAL

(75) Inventors: Bohao Liao, Sollentuna (SE); Marilyn Krukowski, Stockholm (SE)

(73) Assignee: DELAVAL HOLDING AB, Tumba (SE)

( * ) Notice: Subject to any disclaimer, the term of this patent is extended or adjusted under 35 U.S.C. 154(b) by 410 days.

(21) Appl. No.: 13/132,107

(22) PCT Filed: Nov. 3, 2009

(86) PCT No.: PCT/EP2009/064512
§ 371 (c)(1),
(2), (4) Date: Aug. 3, 2011

(87) PCT Pub. No.: WO2010/063527
PCT Pub. Date: Jun. 10, 2010

(65) Prior Publication Data
US 2011/0279650 A1 Nov. 17, 2011

(30) Foreign Application Priority Data

Dec. 3, 2008 (SE) ...................................... 0802521

(51) Int. Cl.
*H04N 13/02* (2006.01)
*G06T 7/00* (2017.01)
(Continued)

(52) U.S. Cl.
CPC ............ *G06T 7/0012* (2013.01); *A01K 29/00* (2013.01); *G06T 7/41* (2017.01); *G06T 7/40* (2013.01);
(Continued)

(58) Field of Classification Search
CPC ........... A01K 29/00; G06T 7/40; G06T 7/401; G06T 7/0012; G06T 7/41;
(Continued)

(56) References Cited

U.S. PATENT DOCUMENTS 5,412,420 A 5/1995 Ellis
6,377,353 B1 4/2002 Ellis
(Continued)

FOREIGN PATENT DOCUMENTS

EP 1 396 188 A2 3/2004
EP 1 537 531 6/2005
(Continued)

OTHER PUBLICATIONS

Johnson, "Spin Images: A Representation for 3-D Surface Matching", Aug. 1997, Carnegie Mellon University, pp. 35, 40.*
(Continued)

*Primary Examiner* — Christopher S Kelley
*Assistant Examiner* — Matthew Kwan
(74) *Attorney, Agent, or Firm* — Finnegan, Henderson, Farabow, Garrett & Dunner LLP

(57) ABSTRACT

An arrangement for determining a body condition score of an animal comprises a three-dimensional camera system directed towards the animal and provided for recording at least one three-dimensional image of the animal; and an image processing device connected to the three-dimensional camera system and provided for forming a three-dimensional surface representation of a portion of the animal from the three- dimensional image recorded by the three-dimensional camera system; for statistically analyzing the surface of the three-dimensional surface representation; and for determining the body condition score of the animal based on the statistically analyzed surface of the three-dimensional surface representation.

28 Claims, 9 Drawing Sheets

(51) Int. Cl.
  *A01K 29/00* (2006.01)
  *G06T 7/41* (2017.01)
  *G06T 7/40* (2017.01)

(52) U.S. Cl.
  CPC .... *G06T 2200/04* (2013.01); *G06T 2207/10028* (2013.01); *G06T 2207/20036* (2013.01); *G06T 2207/30004* (2013.01)

(58) Field of Classification Search
  CPC . G06T 2207/10028; G06T 2207/20036; G06T 2207/30004
  USPC .......................................... 348/46; 119/51.02
  See application file for complete search history.

(56) References Cited

U.S. PATENT DOCUMENTS

| | | | |
|---|---|---|---|
| 2003/0214502 | A1 | 11/2003 | Park et al. |
| 2004/0023612 | A1 | 2/2004 | Kriesel |
| 2005/0257748 | A1* | 11/2005 | Kriesel et al. ............. 119/51.02 |
| 2006/0126903 | A1* | 6/2006 | Sharony ........................ 382/110 |
| 2006/0283269 | A1* | 12/2006 | Anderson et al. ......... 73/863.31 |
| 2008/0212838 | A1 | 9/2008 | Frigerio |
| 2008/0273760 | A1* | 11/2008 | Metcalfe et al. ............. 382/110 |
| 2009/0074253 | A1* | 3/2009 | Peacock et al. ............. 382/110 |

FOREIGN PATENT DOCUMENTS

| | | |
|---|---|---|
| EP | 1 900 278 A1 | 8/2007 |
| RU | 2189174 | 9/2002 |
| RU | 2237284 | 9/2004 |
| WO | WO-2004/012146 A1 | 2/2004 |
| WO | WO 2009/016183 A1 | 2/2009 |

OTHER PUBLICATIONS

T. Leroy, "Automatic Determination of Body Condition Score of Cows Based on 2D Images", Precision Livestock Farming, 2005, pp. 251-255.
G. Hetzel, "3D Object Recognition from Range Images using Local Feature Histograms", IEEE, 2001, pp. 394-399.
J. Bewley, "Potential for Estimation of Body Condition Scores in Dairy Cattle from Digital Images", J. Dairy Sci., 91:3439-3453, 2007.
A. Johnson, "Spin-Images: A Representation for 3-D Surface Matching", Carnegie Mellon University, Thesis Paper dated Aug. 13, 1997.
International Search Report in PCT/EP2009/064512 dated Jan. 25, 2010 from the European Patent Office.
International Search Report in PCT/EP2009/064512 dated Mar. 31, 2011 from the Russian Patent Office.
Written Opinion in PCT/EP2009/064512 from the European Patent Office.
Communication enclosing Third Party Observation in corresponding EU Application No. 09753067.9 (8 pages).
Notice of Opposition to Grant of Patent in corresponding NZ Application No. 592531 (2 pages).
SwissRanger SR-3000 Manual version 1.02, Oct. 2006 (28 pages).
M. Krukowski, "Automatic Determination of Body Condition Score of Dairy Cows from 3D Images: Processing and pattern recognition in images from a time-of-flight camera," MSc Thesis, School of Engineering Physics, Royal Institute of Technology, Stockholm, Sweden, 2009 (89 pages).
C. P. Schofield, "Emerging technology for assessing the composition of livestock," Precision Livestock Farming '05, 2005 (8 pages).
I. Halachmi, "Cow Body Shape and Automation of Condition Scoring," vol. 91, issue 11, p. 4444-4451, Nov. 2008, Journal of Dairy Science (8 pages).
Pompe et al., "Automatic body condition scoring of dairy cows: extracting contour lines," Book of Abstracts, 5$^{th}$ European Conference on Precision Agriculture, 2nd European Conference on Precision Livestock Farming, 2005 (4 pages).
Negretti et al., "Determination of live weight and body condition score in lactating Mediterranean buffalo by Visual Image Analysis," Livestock Science 113:1-7, 2008 (7 pages).
Notice of Opposition to a counterpart European Patent No. 2370952 dated Jun. 24, 2015.
Mottram, Toby et al., "A feasibility study on the automatic recording of condition score in dairy cows," DEFRA report, Jul. 8, 2002.
Hetzel, Gunter et al., "3D Object Recognition from Range Images using Local Feature Histograms," Computer Vision and Pattern Recognition, 2001.

* cited by examiner

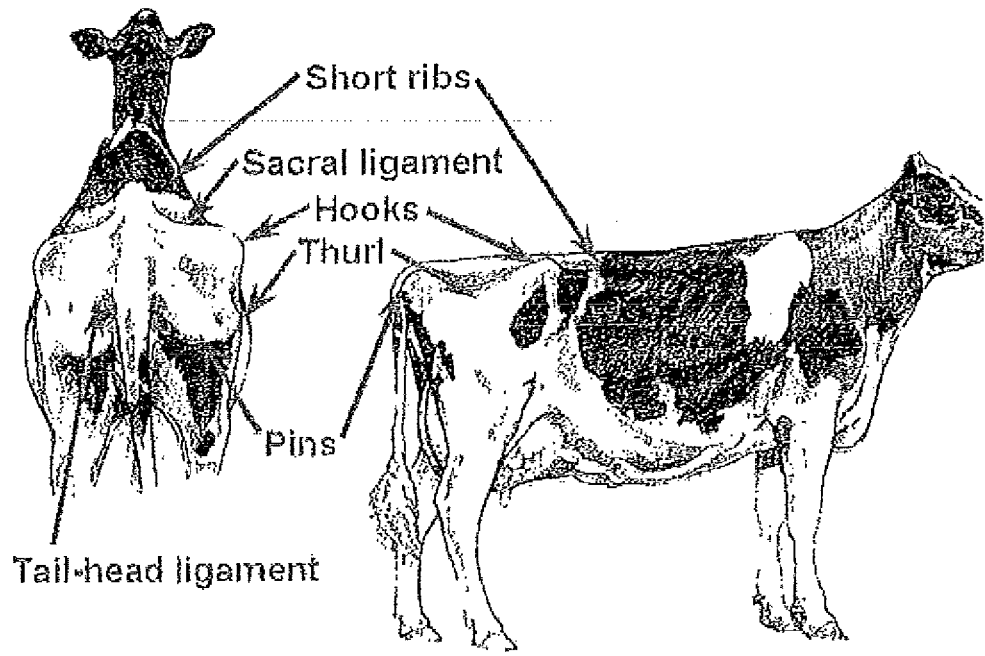
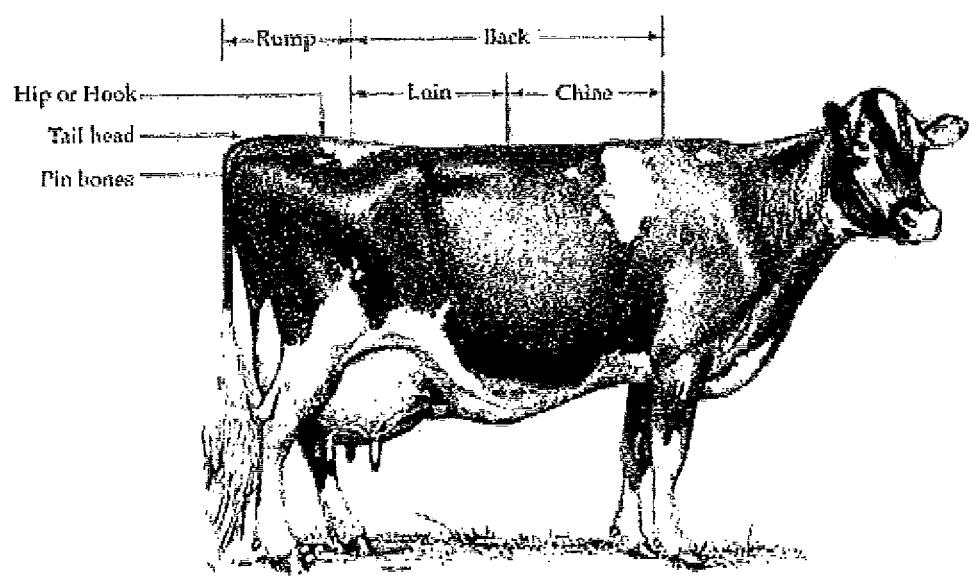
Fig. 3

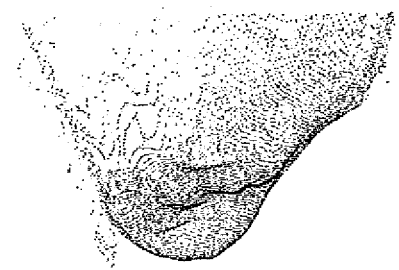
Fig. 6a　　　　　　　　　Fig. 6b
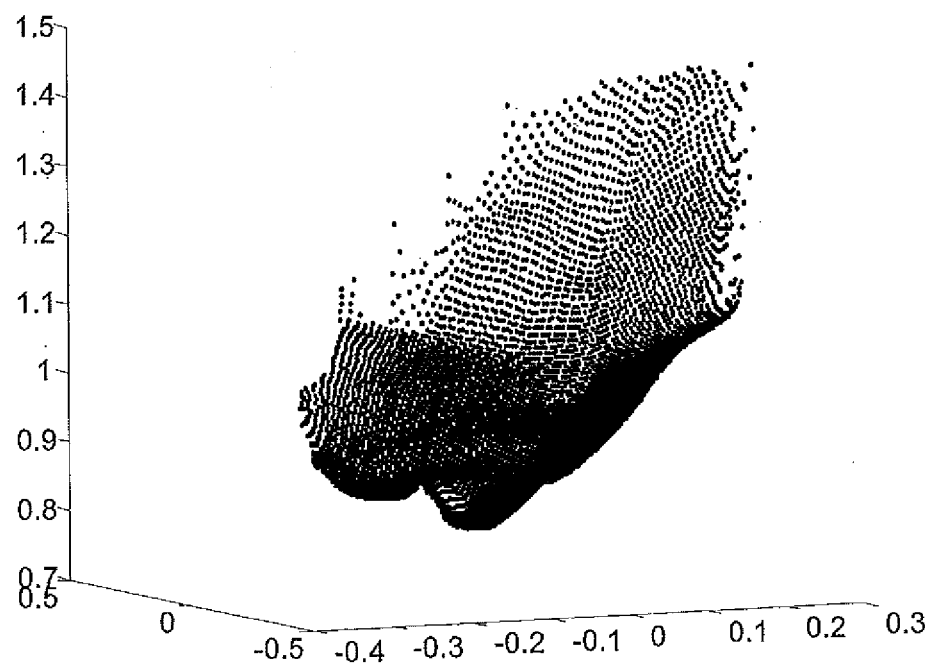
Fig. 7

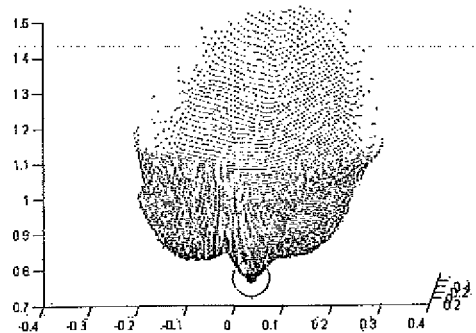
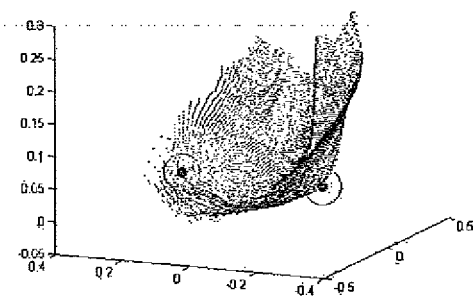
Fig. 8a                    Fig. 8b
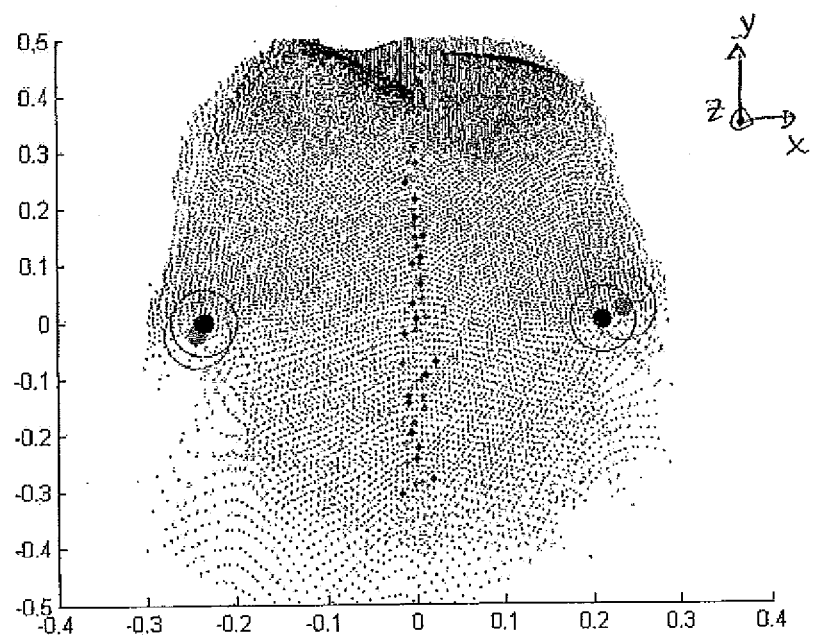
Fig. 9

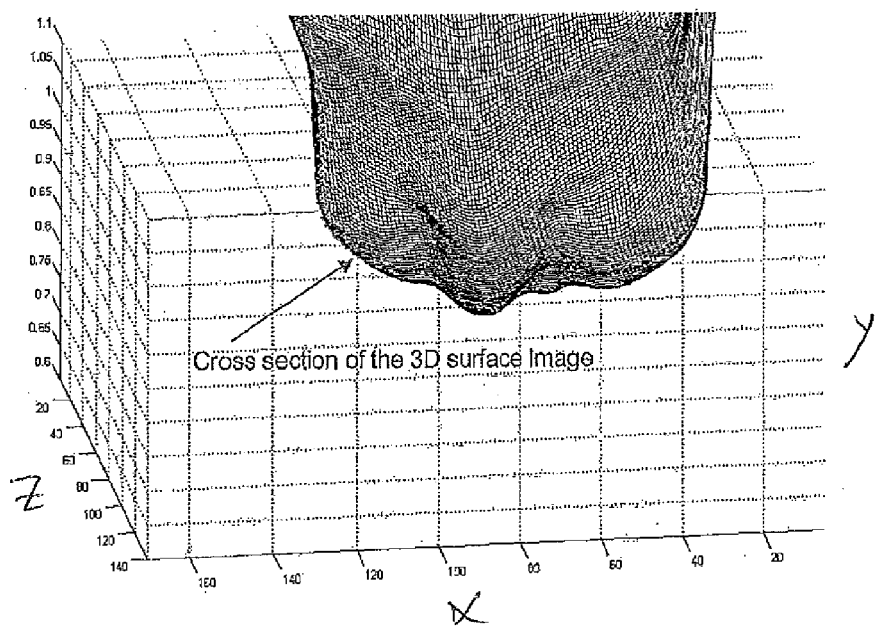
Fig. 12
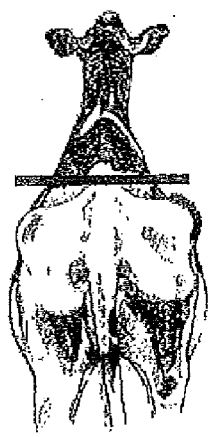
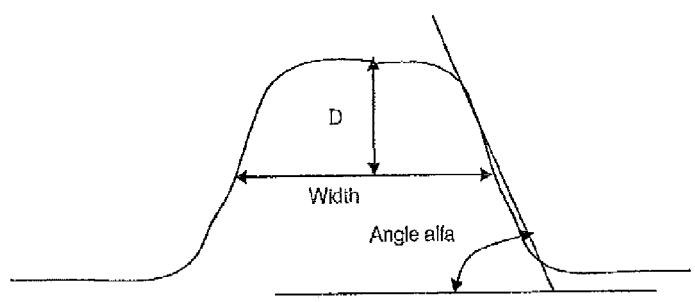
Fig. 13a
Fig. 13b

Short rib

ARRANGEMENT AND METHOD FOR DETERMINING A BODY CONDITION SCORE OF AN ANIMAL

PRIORITY APPLICATIONS

This is a U.S. National Stage Application under 35 U.S.C. §371 based on International Application No. PCT/EP2009/064512, filed Nov. 3, 2009, which claims the benefit of priority to Application No. SE 0802521-5, filed Dec. 3, 2008 in Sweden. Both of these applications are incorporated herein by reference in their entirety.

TECHNICAL FIELD OF THE INVENTION

The present invention relates generally to animal farming and particularly to arrangements and methods for determining body condition scores (BCS) of animals.

DESCRIPTION OF RELATED ART AND BACKGROUND OF THE INVENTION

Body condition scoring is a method of evaluating fatness or thinness in cows according to a scale, e.g. a five-point scale, where a score of one denotes a very thin cow, while five denotes an excessively fat cow. Research and field experiments have shown that body condition influences productivity, re-production, health and longevity. Thus, thinness or fatness can indicate underlying nutritional deficiencies, health problems, or improper herd management. As a mean to detect problems within the herd, body condition scoring is a good aid in improving the health and productivity of a dairy herd, when done on a regular basis, thus acting as an efficient tool in good herd management. Body condition scoring is better for monitoring body energy reserves than body weight. Body weight can change due to changes in body fat, frame size, gut size, udder size, pregnancy status, and intake of food and water.

The body condition of a normal, healthy, cow fluctuates over the lactation periods, as can be seen in FIG. 1. At calving, a recommended body condition score may be 3.25 to 3.75 or somewhat lower. At early lactation the cow increases the production of milk until peak milk production is reached. During this period the cow uses its body reserves to get the energy necessary as food intake will lag behind requirements in the first six to eight weeks of lactation. The goal is to have a loss in the body condition of 0.5 to 0.75 in early lactation. At mid-lactation the body condition score should slowly increase to reach the same recommended value of 3.25 to 3.75 as at calving at the end of late lactation. It is important not to attempt to correct the body condition of the cow during the dry period as this will affect the weight of the calf more than the weight of the cow.

Over-conditioning, or fatness, usually begins during the last three to four months of lactation, when milk production has decreased, but grain and total nutrients levels have not been reduced accordingly. At the time of calving, a cow with a body condition score over 4.0 often results in reduced feed intake and increased incidence of peripartum problems and other difficulties at calving. A fat cow is more susceptible to metabolic problems and infections. Over-conditioned cows tend to have problems with retained placenta, gastroparesis leading to calcium deficit, fat cow syndrome, fatty liver and mastitis. They might even collapse under their excessive weight.

Under-conditioning, or thinness, occurs when a cow has been ill for a longer period, or if not enough energy has been added to the diet during mid- and late lactation. Under-conditioning at calving with a body condition score of less than 3.0 often results in lower peak milk yield and less milk for the entire lactation. It is a health risk in the early lactation when the cow uses much of its body reserves. Also cows should not lose more than 1.0 body score during early lactation as excessive loss of body condition in early lactation has been shown to reduce reproductive efficiency. Under-conditioning can frequently lower production and milk fat levels because of insufficient energy and protein reserves. Thin cows often do not show heat or conceive until they start to regain—or at least maintain—body weight. In feeding these animals, care must be taken to maintain production while increasing body reserves.

A five-point scoring system was developed to measure the relative amount of this subcutaneous body fat. Most body condition scoring systems in dairy cattle use the five-point scoring system with quarter point increments. Instructions for a body condition scoring system have been devised to assess the body condition of a dairy cow at any point during the production cycle. For accurate scoring, both visual and tactile appraisals of back and hind quarters are necessary. The parts considered are the thoracic and lumbar regions of the vertebral column (chine, loin and rump), spinous processes (loin), tuber sacrale (hooks), tuber ischii (pin bones), and anterior coccygeal vertebrae (tail head) which are shown in FIG. 3. A single factor may be misleading; however, all factors considered together provide an accurate score. Each condition score was assessed by the criteria simplified in FIG. 4.

Although the benefits of regular body condition scoring are intuitive to most dairy producers, nutritionists, and consultants, relatively few dairy farms have incorporated it as a part of their dairy management strategy. There are many reasons for the lack of adoption of this system, mostly related to its subjectivity, costs and time commitment required. It is hardly practical in a computerized herd management system.

Dairy scientists have not yet developed the necessary objective research to be able to advice farmers properly. Therefore, there is a need to develop methods to determine the body condition score of individual cows in an automatic manner, which would be more cost effective, objective and easy to connect with data from a herd management system.

Pompe V. J deGraaf, R. Semplonious, and J. Meuleman, "Automatic body condition scoring of dairy cows: Extracting contour lines" Book of Abstracts, 5th European Conference on Precision Agriculture, 2nd European Conference on Precision Livestock Farming, 243-245, 2005 used black-and-white photography and a line laser to collect a series of images from the rear of the cow. A three-dimensional analysis of the images provided an outline of the left pin, left hook, and tailhead. No statistical analysis comparing image analysis with BCS was reported.

T. Leroy, J.-M-Aerts, J. Eeman, E. Maltz, G. Stojanovski, and D. Berckmans, "Automatic determination of body condition score of dairy cows based on 2D images" Precision Livestock Farming 05: 251-255, 2005 used ordinary two dimensional images from the rear of the cow, to obtain a silhouette image. Their study shows that it is possible to evaluate the body score automatically with an accuracy of the result at the same order of magnitude as the error of human evaluation.

Some extensive work on automated body condition scoring for dairy cattle was conducted by Coffey et al. at the Scottish Agricultural College. Light lines were created on the back of the cow by using a red laser light shone through a prism. The camera was positioned at a 45° angle to the horizontal plane of the cows back and the laser lines were used in manual extractions of curvatures over the cow's tailhead and buttocks. The curvature of these shapes was then modelled. The study found a large correlation, with a correlation coefficient of 0.55, between the tailhead curvature and observed BCS, whereas the correlation coefficient of the curvature of the right buttock as measured across the pin bone was 0.52.

An extensive study was produced by J. M. Bewley, A. M. Peacock, O. Lewis, R. E. Boyce, D. J. Roberts, M. P. Coffey, S. J. Kenyon, and M. M. Schutz "Potential for Estimation of Body Condition Scores in Dairy Cattle from Digital Images" Journal of Dairy Science, 91:3439-3453, 2008. Using digital images taken from above, the angles produced by the hook bones were extracted from a contour image. 99.89% of the automatically extracted body condition scores were within 0.5 points of actual score, and 89.95% were within 0.25 points.

In the study of the body condition score of Mediterranean buffaloes using ordinary two dimensional image analysis, P. Negretti, G. Bianconi, S. Bartocci, S. Terramoccia, and M. Verna in "Determination of live weight and body condition score in lactating Mediterranean buffalo by Visual Image Analysis" Livestock Science 113:1-7, 2008 confirmed that computerized image analysis is an effective measuring system. The Italian group also reached important conclusions showing that the automatic measurements of the angle between the back and the hook bones, and automatic measurements of the surface area behind the hook bones, where significantly correlated to the body condition score.

EP 1537531 discloses an imaging method and system for use in automatic monitoring the body condition of an animal. A predetermined region of interest on the animal body is imaged, and data indicative of the acquired one or more images is processed to obtain a three-dimensional representation of the region of interest. The three-dimensional representation is analyzed to determine a predetermined measurable parameter indicative of a surface relief of the region of interest which is indicative of the body condition of the imaged animal. The technique of the present invention is useful for determining the energy balance condition of the animal (e.g., dairy cow) or the tendency in the energy balance change, to thereby enable appropriately adjusting nutrition of the specific animal; as well as for determining the existence of in coordination and/or locomotion in the animal's natural marching.

SUMMARY OF THE INVENTION

A disadvantage of the approaches disclosed above is that detected shapes depend heavily on the movement, background environment, and relative position of the cow with respect to the vision system.

Further, the body condition scorings may not be reliable, accurate, or precise due to limited two-dimensional image data used in the image analysis.

Accordingly, it is an object of the present invention to provide an arrangement and a method for determining a body condition score of an animal, which lack the above described disadvantages and limitations.

It is a further object of the invention to provide such arrangement and method, which are automatic, robust, effective, fast, precise, accurate, reliable, safe, easy to use, and of reasonable cost.

These objects among others are, according to the present invention, attained by arrangements and methods as claimed in the appended patent claims.

According to one aspect of the invention an arrangement for determining a body condition score of an animal is provided, the arrangement comprising a three-dimensional camera system directed towards the animal and provided for instantaneously recording at least one three-dimensional image of the animal; and an image processing device connected to the three-dimensional camera system and provided for forming a three-dimensional surface representation of a portion of the animal from the three-dimensional image recorded by the three-dimensional camera system; for statistically analyzing the surface of the three-dimensional surface representation, in particular analyzing the unevenness, irregularity, or texture of the surface of the three-dimensional surface representation; and for determining the body condition score of the animal based on the statistically analyzed surface of the three-dimensional surface representation.

The three-dimensional surface representation of a portion of the animal is advantageously a representation of a region of the back of the animal located in front of the tail head and narrow enough to not include the hip or pin bones of the animal.

Preferably, the three-dimensional camera system is a time of flight range camera or an active wavefront sampling camera which provides a two-dimensional image of the animal, wherein, for each pixel of the two-dimensional image, the distance between the three-dimensional camera system and the respective object point imaged is provided.

Yet preferably, the three-dimensional camera system is located above and optionally behind, the animal and is directed downwards, and optionally forward, towards the back of the animal to give image information from the dorsal and posterior portions of the animal.

According to a further aspect of the invention a method for determining a body condition score of an animal by using the above described arrangement is provided.

Various embodiments of the invention are set out in the dependent claims.

The statistical analyzing may involve statistical analysis of surface gradients, surface normals, and/or range or depth values of the surface of the three-dimensional surface representation.

Additionally or alternatively, the statistical analyzing may involve statistical analysis of spectral measures of the unevenness of the surface of the three-dimensional surface representation.

Still additionally or alternatively, the statistical analyzing may involve statistical analysis of surface curvatures or spin-images of the surface of the three-dimensional surface representation.

Advantageously, the statistical analyzing includes the calculation of statistical properties of a histogram of a feature parameter of the surface of the three-dimensional surface representation. The statistical properties may comprise mean value, standard deviation, smoothness, skewness, uniformity, entropy, the width of the histogram, the width at the half maximum value, and/or parameters of a curve fitted to the histogram.

Advantages of the present invention as compared to the usually conducted and manually performed body condition scoring by experienced herdsman via visual inspection and contact include the following.

The automatically performed body condition scoring of the invention is not subjective; it is not influenced by environment such as lighting, impression, knowing of animals, or personally dependent.

Further, it is cost efficient and no time consuming work by skilled herdsman is required. The invention can easily be employed in large herds with high number of animals on a daily basis. The trend of body condition score can thus be traced and tracked frequently.

Still further, the BCS resolution can be increased. The reliability and accuracy can be increased.

Several of the advantages are equally valid when comparing the invention with the automatic and semi-automatic approaches disclosed in the background section.

In particular, the statistical analyzing of an instantaneously recorded three-dimensional surface representation of a portion of the animal may provide accurate and reliable body condition scores.

According to further aspects of the invention there are provided an arrangement and a method for determining a body condition score of an animal. The arrangement comprises a three-dimensional camera system and an image processing device connected to the three-dimensional camera system. At least one three-dimensional image of a portion of the animal is recorded by the three-dimensional camera system. A three-dimensional surface representation is formed from the three-dimensional image; the three-dimensional surface representation is normalized; and the body condition score of the animal is determined based on the surface of the normalized three-dimensional surface representation.

The normalization is preceded by searching for reference points, e.g. the spinal ridge and the pin or hook bones, in the three-dimensional surface representation of the portion of the animal, which will serve as control points for the normalization.

Preferably, the three-dimensional surface representation of the portion of the animal is normalized by means of rotation, translation, and scaling based on the location of the reference points such that the spinal ridge is essentially parallel with a first axis of a Cartesian coordinate system, the connection line between the tips of the pin or hook bones is essentially parallel with a second perpendicular axis of a Cartesian coordinate system, and the scaling of the three-dimensional surface representation is made depending on the distance between the tips of the pin or hook bones.

By such normalization body condition scores can be determined irrespective of the recording angle of the three-dimensional camera system. The image can be recorded while the animal is walking or moving.

According to still further aspects of the invention there are provided an arrangement and a method for determining a body condition score of an animal. The arrangement comprises a three-dimensional camera system and an image processing device connected to the three-dimensional camera system. At least one three-dimensional image of a portion of the animal is recorded; a three-dimensional surface representation is formed from the three-dimensional image; anatomical features are recognized in the three-dimensional surface representation; feature parameters of the recognized anatomical features are calculated; and the body condition score of the animal is determined based on the calculated feature parameters of the anatomical features recognized in the three-dimensional surface representation.

Further characteristics of the invention and advantages thereof, will be evident from the following detailed description of preferred embodiments of the present invention given hereinafter and the accompanying FIGS. 1-16, which are given by way of illustration only, and are thus not limitative of the present invention.

BRIEF DESCRIPTION OF THE DRAWINGS

FIG. 3 illustrates the areas considered when scoring the body condition of a cow.

FIGS. 6a-b illustrate point clouds of original unfiltered (FIG. 6a) and filtered (FIG. 6b) image data of a cow recorded by the arrangement of FIG. 5. The images show the profile of the rump from the hook bones to the pin bones and the protruding tailhead furthest down in the image.

FIG. 7 illustrates segmentation of data isolating the surface of the cow.

FIG. 8a illustrates a global minimum found in the surface representation of the cow used for localization. FIG. 8b illustrates the data translated and rotated. The spine and hook bones of the cow have been localized.

FIG. 9 illustrates a comparison of two images of a cow pinpointing the hook bones.

FIG. 12 is a three-dimensional surface representation of the back of a cow.

FIGS. 13-16 illustrate various anatomical features and feature parameters measured by various analyzing methods comprised in the invention.

DETAILED DESCRIPTION OF EMBODIMENTS

Figure 5:
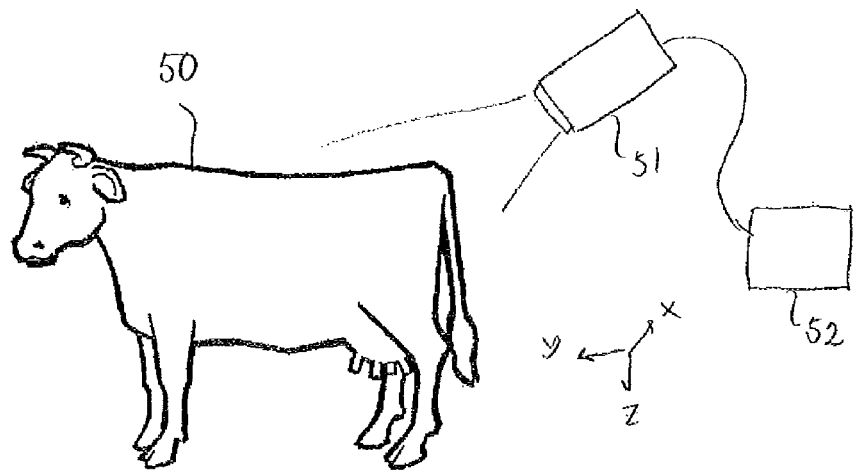
FIG. 5 displays a schematically outlined arrangement for determining a body condition score of an animal according to an embodiment of the present invention.

FIG. 5 shows an arrangement for determining a body condition score of an animal such as a cow 50 comprising a three-dimensional camera system 51 directed towards the cow 50 and provided for instantaneously recording at least one three-dimensional image of the cow 50, and an image processing device 52, such as a microcomputer provided with suitable software, connected to the three-dimensional camera system 51.

The image processing device 52 is provided for processing the three-dimensional image recorded by the three-dimensional camera system 51; for forming a three-dimensional surface image or representation of a portion of the cow 50 from the processed three-dimensional image; for statistically analyzing the three-dimensional surface image; and for determining the body condition score of the cow based on the statistically analyzed three-dimensional surface image. The image processing and analyzing will be discussed in detail further below.

The three-dimensional camera system 51 is preferably time of flight range camera such as the Mesa Imaging AG® Swiss Ranger SR-3000 sensor. It is a complete solid-state Time-of-Flight range camera developed by CSEM (Centre Suisse d'électronique et de microtechnique). It is connected to the microcomputer 52 via USB 2.0 for direct measurement of real-time depth maps and is designed for operation under indoor lighting conditions.

The time of flight (TOF) technique is based on measurements of the distance to an object based on the time that it takes for the infra red light with a peak wavelength of 850 nm to reflect on the object and reach the sensor while traveling at a known speed. The measured distance is proportional to twice the time needed for the waves to travel from the camera to the object. What is actually measured is a phase shift between the outgoing signal and the detected reflected signal.

The above exemplified camera is based on a two dimensional image sensor with a field of view of 47.5×39.6 degrees with a spatial resolution of 176×144 pixels using a CMOS active-pixel sensor. The technology is very similar to CCD-technology. The resulting output is a four dimensional representation of the view showing the intensity information at each pixel, in correlation with an ordinary digital camera. In addition, each point's relative position to the camera is given with its x, y and depth (z) value. When combining the information in the x-, y- and z-channels, it is possible to create a three-dimensional visualization of the scene.

Setting the amplitude threshold, noisy pixels can be filtered. The amplitude determines the amount of emitted light that is reflected back on the pixel. The integration time controls the exposure time for the acquired image.

Alternatively, the three-dimensional camera system 51 is based on other technology to provide the three-dimensional visualization of the scene. For instance, the three-dimensional camera system 51 may be a camera system using laser triangulation or a stereo vision system, optionally equipped with a light source and speckle generating arrangement for creating light having a speckle pattern. Yet alternatively, the three-dimensional camera system 51 is an active wavefront sampling camera, which has a two-dimensional array of pixels and which is capable of providing, for each of the pixels, a distance between the camera and the object point imaged.

Virtually any kind of three-dimensional camera system that is capable of providing three-dimensional surface representations of the scene may be used in the present invention.

Preferably, the three-dimensional camera system 51 is located above and optionally behind the cow 50 and is directed downwards and optionally forward towards the back of the cow 50 to give image information from the dorsal and posterior portions of the cow, including the spine, the hook bones, the pin bones and the tail head.

Alternatively, the three-dimensional camera system is located above the cow at an angle with respect to a vertical plane parallel with a longitudinal direction of the cow and directed diagonally downwards towards the cow.

Still alternatively, the three-dimensional camera system is located at a side of the cow, and optionally above the cow, and is directed sideways and optionally downwards to gives a lateral/dorsal image showing the area between the pin bones and the hook bones of the cow, and the edge of the spinal processes.

Yet alternatively, the three-dimensional camera system comprises several three-dimensional cameras located at different locations and directed towards the cow to cover a larger surface area of the cow.

The inventive arrangement is preferably arranged at a cow arrangement such as a feeding, milking, or resting station provided with a cow identification device. Preferably, the inventive arrangement is provided for determining the body condition score of each cow repeatedly at a rather high frequency such as e.g. daily.

Figure 1:
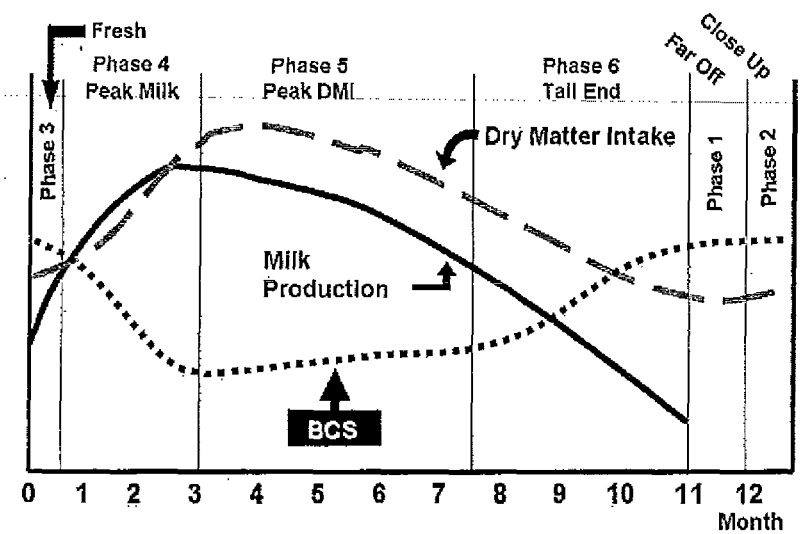
FIG. 1 is a diagram illustrating normal fluctuation of body condition score over different lactation periods in dairy cows.
Figure 2:
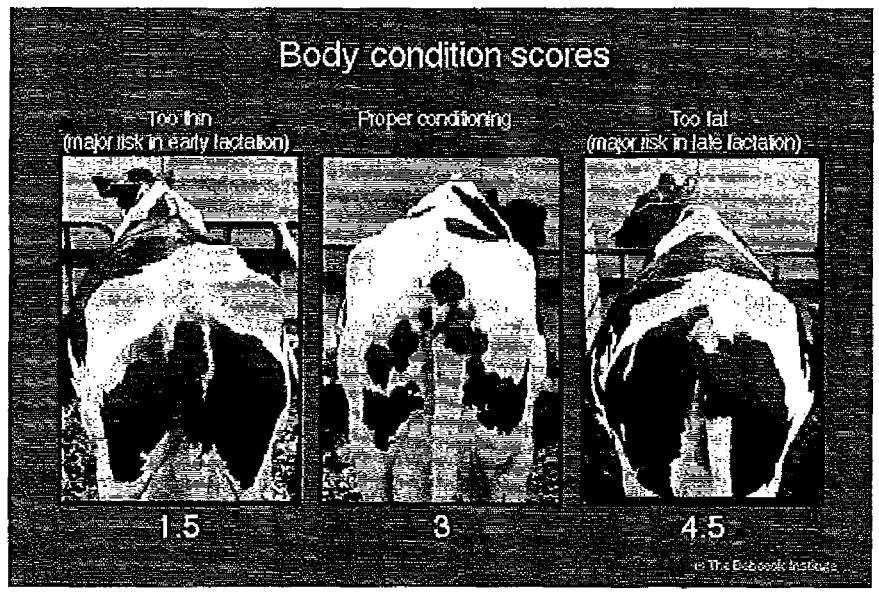
FIG. 2 illustrates pictures showing from the left, a severely under-conditioned cow, a normally conditioned cow, and a severely over-conditioned cow.
Figure 4:
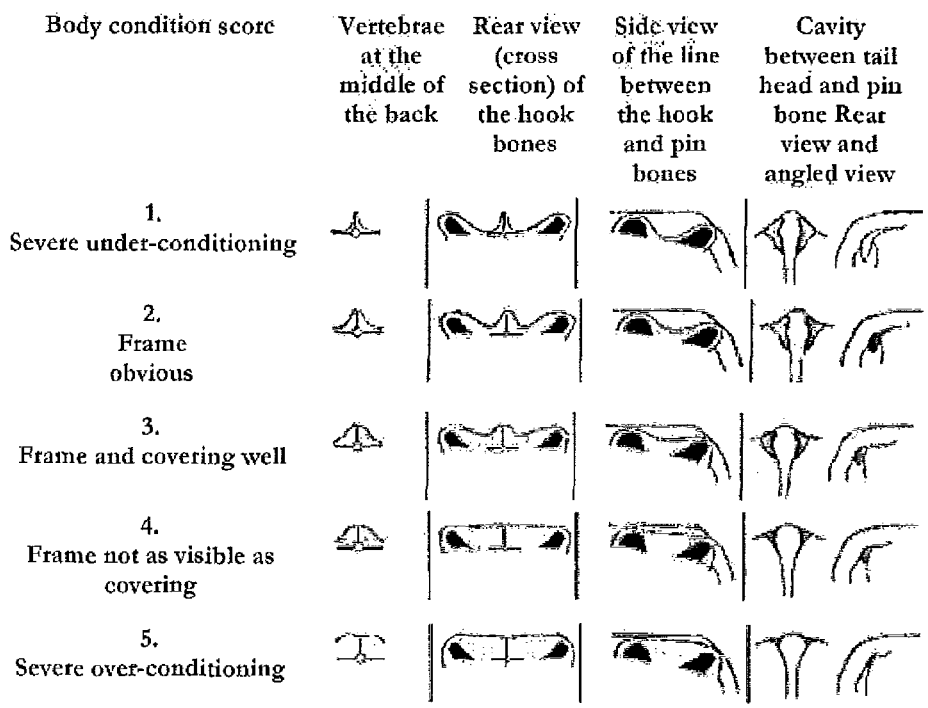
FIG. 4 is a simplified body condition score chart.

Further, the inventive arrangement may be operatively connected to a herd management system and deliver BCS data thereto. In such manner, the BCS could be tracked and compared with the expected BCS at each instant, which differs over time as shown in FIG. 1. The expected BCS could be historical BCS values for that animal or for a similar animal (race, age, etc.), optionally compensated for the increasing age of the animal.

If the measured BCS deviates from the expected BCS by at least a given amount, this may trigger an alarm to be activated or an action to be taken automatically with respect to the animal, e.g. the feeding of the animal could be changed with respect e.g. to its nutritional content, or the animal could be treated in some manner, by means of an automated apparatus operatively connected to the herd management system. In particular, the above tracking is important the first time, e.g. the first months, after calving, when the BCS drops.

Processing of Raw Image Data

The processing of the raw image data comprises filtering and segmentation.

The filtering function used combines the two-dimensional intensity image with the range information to deal with objects that are so far away as to give misleading depth information. Objects that are far away reflect light with lower intensity than close object. Pixels with intensity below a chosen value can therefore be located and their depth value set to a distance of about the distance at the cow's neck. The erroneous points would hence not interfere in the regular filtering. The result of the Wiener filter can be seen in FIGS. 6a-b, which illustrate point clouds of original unfiltered (FIG. 6a) and filtered (FIG. 6b) data. The last step in the filtering process is identifying all pixels where the range value is above a chosen value, thus becoming uninteresting for analysis. These points normally belong to the interiors of the barn, the head of the cow and neighboring cow. Their value is set to the distance of the cow's neck.

Next, the image is segmented, i.e. the image is partitioned into multiple regions (sets of pixels). The goal of segmentation is to simplify or change the representation of an image into something that is more meaningful and easier to analyze. Image segmentation is typically used to locate objects and boundaries (lines, curves, etc.) in images. In this context, segmentation is used for identifying the upper surface of the cow.

As a primary segmentation, a sensitive Canny edge detecting function is applied to the filtered data. The Canny method finds edges by looking for local maxima of the gradient in the image. The gradient is calculated using the derivative of a Gaussian filter. The method uses two thresholds, to detect strong and weak edges, and includes the weak edges in the output only if they are connected to strong edges. This method is therefore less likely than the others to be affected by noise, and more likely to detect true weak edges.

FIG. 7 illustrates segmentation of data isolating the surface of the cow.

Anatomical Feature Recognition; Normalization

As most feature recognition methods are based mainly on geometric information, in three-dimensional techniques it is even more important than in two dimensions to carry out an appropriate normalization of the object image.

In order to normalize the cow image, the first step is to find feature or reference points, which will serve as control points for the normalization process. The feature points considered for normalization are the tail head, the pin bones, the hook bones and the spinal ridge. The image of cow is normalized in a series of rotations and translations based on the location and relation of the feature points.

As a primary localization of the cow in the image, the minimum range value is located, which always belong to a point on the tail. The cows are generally photographed at an angle of about 45° from their back, so as to find the location and orientation of the spine; the images are rotated 45° around the x-axis. The image data may be quite sparse, but by taking slices of the cow, the local minimum in each slice can be found, representing the highest point on the cow's back in that area. All the points together form the shape of the spine. Through these points a mean value line is approximated and the images are automatically translated and rotated to fit the spine line onto the y-axis. This is followed by the identification of the hook bones by rotating the image to the left and to the right and finding the local minima in these directions. In an iterative manner, the cow is aligned so that the spine follows the y axis and the hips are in a plane normal to the xy-plane, symmetric about the x-axis. Alternatively or additionally, the pin bones and/or the tail head are/is used for the rotation and translation processes.

The distance between the hook bones may be used for scaling the image. Alternatively, other features are used for scaling such as the length of the animal, the length of the spinal ridge, the distance between the pin bones, etc.

The normalization is used in order to be capable of obtaining correct body condition scores independently of the size of the animal, the distance between the camera system and the animal, and the view angle of the camera system.

FIG. 8a illustrates a global minimum found for localization. FIG. 8b illustrates the data translated and rotated. The spine and hook bones have been localized.

Feature Extraction

Two different methods of finding correlations between parameters and BCS are generally interesting: a global method using statistical measures of surfaces of modified range images and surfaces, and a local method where curves and angles are fitted to contours.

The latter method has shown good results on controlled images, but the anatomical points that indicate the BCS do not always correspond to obvious visual contours. In automatic extraction of feature points, the exactness of the identification is limited. FIG. 9 shows the accuracy of pinpointing the hook bones in two images of one cow, taken at the same occasion. There are also large differences between individual cows in shapes which make it reasonable to attempt a different approach, i.e. the global approach with statistical analysis of surfaces.

In general terms, the interest for robust feature recognition has increased largely lately. During the last years, many new systems have been developed that can store biometrical information such as facial structure, fingerprint or voice, in order to be used for verification tasks where security is concerned. Recently, many two-dimensional feature recognition applications have been carried out with optimal results obtained for images acquired in controlled conditions. The main constraints of these techniques are: firstly, the influence of illumination, as the shaded parts of the cow may mislead the verification process, and secondly, the changes of pose.

However, both humans and cows are three-dimensional, so projecting them as two-dimensional objects provokes information loss. With the development and improvement of three-dimensional data acquisition devices, mostly three-dimensional face recognition techniques have received more interest. Nowadays, this is one of the most vigorous research areas within biometrics. Although a cow differs in many aspects from a human face, to use three-dimensional face features recognition tools could be advantageous.

Due to the novelty of three-dimensional feature recognition techniques, there are not many published results. In general, two kinds of aspects are treated: firstly the use of range data, translating the three-dimensional information into a two-dimensional depth map or distance to the acquisition system, and secondly, the use of three-dimensional mesh object representation. When combining different global statistical measures, it is necessary to combine the two aspects.

Statistical Measures

Many portions of the image of a cow are devoid of sharp edges over the areas of the back and loin area, with the exception of the occlusion in front of the hook bones. In these areas, the surface texture is found to be different for skinny and fat animals since bones such as the vertebrae of the back of the animal are much more clearly marked on a skinny animal than on a fat animal. Thus, image texture measurements can be used for classification of the cows according to their body condition score. Texture is often qualitatively described by its coarseness, in the sense of looseness or roughness in texture. The coarseness is related to the spatial repetition period of the local structure. A larger period implies a rougher structure, whereas a small period implies an even structure. Important is to recognize that the coarseness is a relative measure of the texture in the neighborhood of an image point. Because texture is a spatial property, measurements should be restricted to relatively uniform regions. This is the case of the back area. Because of the occlusion behind the hook bones, and the varied curvature close to the tail head, a smaller region of one third of the hip width, and twice the distance in length has been found to be a good candidate for statistical evaluation. It shall be appreciated that the smaller region does not include large or heavily protruding features such as the hip bones, pin bones, or the tail head. Preferably, the smaller region is located in front of the tail head. It has been shown that the unevenness of the surface of this region is well correlated with the BCS of an animal and that this region provides data which is not very sensitive to noise, view angle, etc.

To analyze the structure or unevenness of the surface statistically it may be necessary to make a quadratic interpolation using a mesh function to obtain a surface with evenly spaced values.

A frequently used approach for structure analysis is based on statistical properties of local feature histogram. The descriptors commonly used based on the histogram h(z) of a region are calculated using the moments about the mean as described below:

Mean $$m = \sum_{i=0}^{L-1} z_i h(z_i)$$

Standard Deviation $$\sigma = \sqrt{\sum_{i=0}^{L-1} (z_i - m)^2 h(z_i)}$$

Smoothness $$R = 1 - 1/(1+\sigma^2)$$

Skewness $$S = \sum_{i=1}^{L-1}(z_i - m)^3 h(z_i)$$

Uniformity $$U = \sum_{i=0}^{L-1} h^2(z_i)$$

Entropy $$E = -\sum_{i=0}^{L-1} h(z_i)\log_2 h(z_i)$$

In addition, the width of the histogram, and the width at the half maximum value may be computed, as well as the parameters of a curve, cubically fitted to the histogram.

Spectral measures of texture based on the Fourier spectrum are well suited for describing the directionality of two dimensional patterns in a depth image. As the texture coarseness is proportional to its spatial period, a region of rough texture, comparable to a skinny cow, should have its Fourier spectral energy concentrated at low spatial frequencies. Equally, smooth regions, such as the back of a fat cow, should exhibit a concentration of spectral energy at high spatial frequencies. Interpretation of spectrum features is simplified by expressing the spectrum in polar coordinates as a function $S(r,\theta)$, where r is the frequency and $\theta$ the direction. The descriptors are obtained by summing for discrete variables:

$$S(r) = \sum_{\theta=0}^{\pi} S_\theta(r), \quad S(\theta) = \sum_{r=1}^{R_0} S_r(\theta)$$

For each direction $\theta$, $S(r, \theta)$ is considered as a one-dimensional function $S_\theta(r)$ which yields the behavior of the spectrum along a radial direction for a fixed $\theta$, and similarly for each frequency r, $S_r(\theta)$ is evaluated yielding the behavior along a circle cantered at the origin. The following descriptors of the general functions have been computed: mean, variance, the maximum value and the difference between the maximum value and the mean of $S(r)$ and $S(\theta)$, respectively.

Feature Parameters for Statistical Measures

In order to find the optimal parameters to link to the body condition score, statistical properties of different parameters of the surface are examined. Four shape-specific parameters have been analyzed: range or depth values, damped range or subtracted depth values, point gradients and surface normals. The range values are measured from the xy-plane in the normalized data set to the surface and describe the shape of the back. In an effort to exclude the individual fluctuations, a strongly filtered image is subtracted from the originally filtered and the range values as measured from the xy-plane in that subtracted image are referred to as damped range values. The idea is that a strong filter only leaves the basic shape of the cow, and subtracting the images should leave only the fluctuations due to fatness. Distance histograms though are problematic when the depth range can be influences by other objects or background clutter.

For a variable less sensitive to a perfect normalization, it is interesting to examine the gradient. The gradient of a function of two variables, $z=f(x,y)$, is defined as $$\nabla f = \frac{\partial f}{\partial x}\hat{i} + \frac{\partial f}{\partial y}\hat{j}$$

and can be thought of as a collection of vectors pointing in the direction of increasing values of f. The norm of these vectors at each point describes the shape of the back.

Another way to analyze the surface curvature is by surface normals. Surface normals can easily be calculated from first derivatives of the image. After the usual normalization, two components of the resulting vector could be relevant. Research has shown that a representation as a pair of angles $(\phi, \theta)$ give reliable results. Given an oriented point p, with a normal vector $(n_x, n_y, n_z)$, the normal can be defined by two angular parameters: $\phi$ and $\theta$.

These parameters are represented in a map $N_0$:

$$N_0: R^3 \to R^2$$

$$N_0(p): (\varphi, \theta) = \left(\arctan\left(\frac{n_y}{n_x}\right), \arctan\frac{\sqrt{(n_y^2 + n_x^2)}}{n_z}\right)$$

$\phi$ represents the fluctuations in the xy-plane, and $\theta$ gives the fluctuations of the normal around the z-axis.

There are other shape-specific parameters that are easy to calculate, robust to viewpoint changes, and that contain important information. Two interesting parameters are spin-images and surface curvatures.

Figure 10:
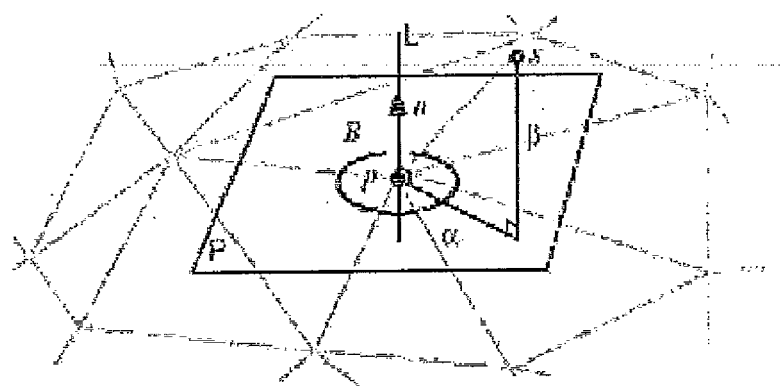
FIG. 10 illustrates parameters of a geometrical spin image as used in an analyzing method comprised in the invention.

Spin-images is a global registration technique developed by A.E. Johnson based on a local characterization of the surface, translating the three-dimensional information into a two-dimensional image associated with each oriented point on the surface, see A. E. Johnson. "Spin Images: A representation for 3-D Surface Matching" PhD Thesis, Robotics Institute, Carnegie Mellon University, 1997. Given an oriented point p, each other point $p_i$ can be defined, with reference to p, by two parameters: $\alpha$ and $\beta$, see FIG. 10. These parameters are represented in a map $S_0$:

$$S_{0:R}{}^3 \to R^2$$

$$S_0(x):(\alpha,\beta)=(\sqrt{\|x-p\|^2-(n\cdot(x-p))^2}, n\cdot(x-p))$$

Encoding the density of points in the map, the two-dimensional array representation of a spin-image can be produced. This image represents the relative distance between the oriented point and the other points in the data. Therefore, it would be similar to a space histogram.

Surface curvature can be calculated either directly from first and second derivatives, or indirectly as the rate of change of normal orientation in a certain local context region. The Gaussian curvature K, and mean curvature H, are strongly correlated and thus provide a poor representation. Instead G. Hetzel, B. Leibe, P. Levi, B. Schiele describe in "3D Object Recognition from Range Images using Local Feature Histograms" Proceedings of the 2001 IEEE Computer Society Conference on Computer Vision and Pattern Recognition 2:11394-11399, 2001 the curvature by a shape index, which can be used in the present invention.

Examining Feature Parameters in Data

Figure 11:
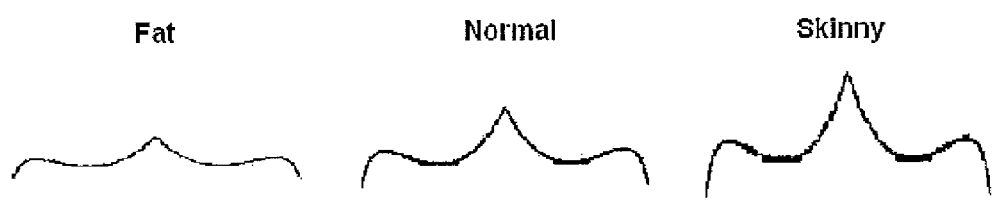
FIG. 11 illustrates simulated changes in body condition by manipulating the z-values of the image data.

The four feature parameters range, damped range, gradient and surface normal, together with all the statistical parameters, result in about ninety factors to analyse. To make a first exclusion and see which factors could be more significant than other, a simple model of a cow with different body condition is made. The model is created by using the interpolated surface from an image of a real cow, with a body condition score of 3.0. The z-value of the data is manipulated by a factor ranging from 0.8 to 1.2. Lower values simulate a fat cow by making the back flatter, and high values give a bonier and skinnier simulation of a cow. FIG. 11 gives an idea of how the model works.

Testing on the model resulted in about thirty parameters with a reasonable change in value between the manipulated images. The statistical parameters are calculated for each image for potential influence on the body condition score and recorded separately. If any parameter value resulted as a NaN (Not a Number), the image is considered to be of insufficient quality and excluded from further evaluation. The feature parameters recorded are listed in table 4.1.

TABLE 4.1

Feature parameters for reflecting the body condition score

| | |
|---|---|
| Range value image | Mean and standard deviation Width and width at half maximum of histogram |
| Damped range value image | — |
| Gradient image | Mean and standard deviation Width and width at half maximum of histogram |
| Image of surface normals, $\phi$ | — |
| Image of surface normals, $\theta$ | Mean and standard deviation Histogram: Width, average, standard deviation, smoothness, uniformity, entropy and the coefficients and behavior of a fitted cubic curve Fourier: All parameters |

An average of each parameter is calculated for each 5-image sequence from one photograph. Correlation and cross-correlation of the parameters with the body condition score, together with the closeness of the parameter to follow the known fluctuation of the BCS during the months after calving, are used to analyze models for prediction. Only effects with a high correlation coefficient >0.5 are considered for the model. The reliability of a parameter may be examined by comparing the spread in values in one recorded image with the dynamic range.

Two models are used for this set of parameters.

The first model includes only the linear combination of the better correlated parameters as predictions of BCS. These are numbered 4: mean range value, 5: standard deviation in range value, 8: mean gradient norm, 14: average $\theta$, the angular deviation from the z-axis, 18: uniformity in histogram of $\theta$, 20:entropy in histogram of $\theta$, and 30: mean $S(\theta)$ describing the randomness of the shape. Because the relation between BCS and individual parameters 4, 5, 18 and 20 seems to have a quadratic relation, a model of second degree have been created, attempting to include the quadratic relation.

The linear model (model 1), independent of individual cows, is defined as $$k_i = C + c_4 p_{4i} + c_5 p_{i5} + \ldots + c_{30} p_{i30}$$

where $k_i$ is the BCS of image i; $p_{ni}$ the $n^{th}$ parameter of the $i^{th}$ image, $c_n$ are the model coefficients, and C is the intercept, which are determined based on manually determined BCS values for a number of animals.

The quadratic model (model 2) of these parameters is defined as $$k_i = C + c_4 p_{4i} + c_5 p_{i5} + \ldots + c_{30} p_{i30} + c'_4 p_{4i}^2 + \ldots + c'_{20} p_{20i}^2$$

where $c'_n$ are the model coefficients corresponding to the squared parameters. For both models the unknown coefficients for predicting the BCS value are found by applying the least squares method on the parameters.

The above models may be calibrated and re-calibrated by means of comparing the BCS of the models with manual BCS determinations made by experts.

Alternatively, artificial neural networks are used to combine the statistical measures to determine a body condition score for a cow. The model can use data sets from cows with known varying body condition scores to gradually enhance accuracy and precision.

Alternative Anatomical Features, Feature Parameters, and Statistical Measures

FIG. 12 is a normalized three-dimensional surface representation of the back of a cow as taken by the three-dimensional camera system 51 of the inventive arrangement.

FIGS. 13-16 illustrate various anatomical features and feature parameters of the surface of the normalized three-dimensional surface representation that can be used in the present invention. Generally, the feature parameters can be length, depth, angle, distance, etc for specific anatomical features in the three-dimensional surface representation that are sensitive to body condition, and less sensitive to daily variations like drinking and eating and breeding/lactation stage. Other feature parameters may be raze, age, lactation stage, etc.

FIG. 13a illustrates one interesting anatomical feature, namely the vertebrae of the cow. The sharpness of the vertebrae is a good indicator for body condition score and feature parameters representing the sharpness of the vertebrae include widths of the vertebrae at a distance D from their tops and the slopes alfa of the vertebrae as being illustrated in FIG. 13b.

Figure 14A:
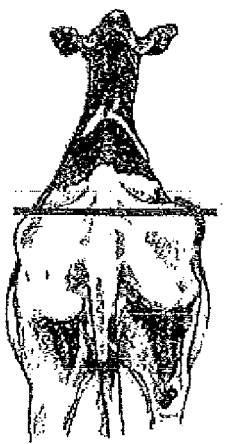
Figure 14B:
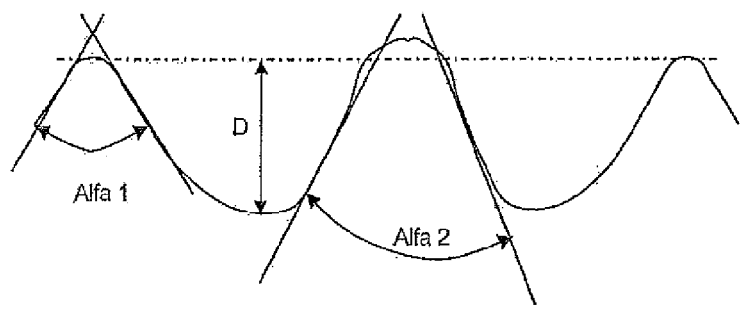

FIG. 14a illustrates other anatomical features, namely the hook bones. Feature parameters include the height D of the hook bones, and the angles alfa1 and alfa2 as being illustrated in FIG. 14b.

Figure 15A:
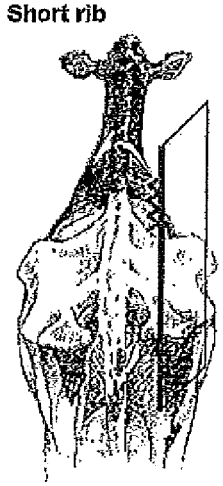
Figure 15B:

FIG. 15a illustrates the short ribs of the cow and corresponding parameters may be the distances D as being illustrated in FIG. 15b.

Figure 16:
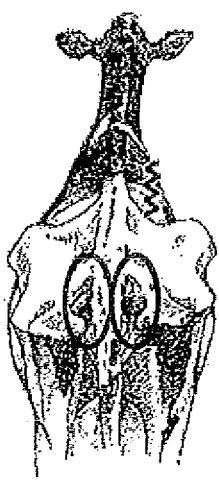

FIG. 16, finally, illustrates the cavities between the tail head and the pin bones. Corresponding parameters may be the depths and sizes of these cavities.

The feature parameters illustrated in FIGS. 13-16 are calculated from a portion of the three-dimensional surface representation which includes the respective feature(s). Optionally, statistical measures as e.g. any of those disclosed earlier in this description, may be calculated for the feature parameters illustrated in FIGS. 13-16.

Yet further, the feature parameters described earlier in this description may be employed for the anatomical features illustrated in FIGS. 13-16.

The invention claimed is:
1. An arrangement for determining a body condition score of an animal, comprising:

a three-dimensional camera system provided for being directed towards the animal and for recording at least one three-dimensional image of the animal; and an image processing device connected to the three-dimensional camera system and provided for:

forming a three-dimensional surface representation of a portion of the animal from the three-dimensional image recorded by the three-dimensional camera system;

statistically analyzing the surface of the three-dimensional surface representation;

determining the body condition score of the animal based on the statistically analyzed surface of the three-dimensional surface representation, wherein the statistical analyzing includes calculating statistical properties of a histogram that compares how measurement data may vary over the surface of the three-dimensional surface representation, and wherein the statistical properties comprise at least one of mean value, standard deviation, smoothness, skewness, uniformity, entropy, the width of the histogram, the width at the half maximum value, or parameters of a curve fitted to the histogram;

searching, prior to normalizing the three-dimensional surface representation, for reference points in the three-dimensional surface representation of the portion of the animal serving as control points for the normalization, said reference points including the spinal ridge and the pin or hook bones of the animal in the three-dimensional surface representation; and normalizing the three-dimensional surface representation of the portion of the animal by rotation, translation, and scaling based on the location of the reference points such that the spinal ridge is essentially parallel with a first axis of a Cartesian coordinate system, a connection line between the tips of the pin or hook bones is essentially parallel with a first axis of a Cartesian coordinate system, and the scaling of the three-dimensional surface representation is made depending on the distance between the tips of the pin or hook bones.

2. The arrangement of claim 1, wherein said at least one three-dimensional image of the animal comprises a two-dimensional image of the animal and, for each pixel of the two-dimensional image, the three-dimensional image further includes a distance value reflecting a distance between the three-dimensional camera system and an object image point associated with the respective pixel.

3. The arrangement of claim 1, wherein said statistical analyzing includes analyzing the unevenness of the surface of the three-dimensional surface representation.

4. The arrangement of claim 1, wherein the histogram is of a feature parameter of the surface of the three-dimensional surface representation, wherein the feature parameter is one of surface gradients, surface normals, or range or depth values.

5. The arrangement of claim 1, wherein said statistical analyzing includes analyzing spectral measures of the unevenness of the surface of the three-dimensional surface representation.

6. The arrangement of claim 1, wherein said statistical analyzing includes analyzing surface curvatures or spin-images of the surface of the three-dimensional surface representation.

7. The arrangement of claim 1, wherein said statistical analyzing includes analyzing feature parameters of the vertebrae of the animal.

8. The arrangement of claim 1, wherein said statistical analyzing includes analyzing feature parameters of the hook bones of the animal.

9. The arrangement of claim 1, wherein said statistical analyzing includes analyzing feature parameters of the ribs of the animal.

10. The arrangement of claim 1, wherein said statistical analyzing includes analyzing feature parameters of cavities between the tail head and the pin bones of the animal.

11. The arrangement of claim 1, wherein the portion of the animal is a region of at least one of the back or loin of the animal.

12. The arrangement of claim 11 wherein the portion of the animal has an area, which area is smaller than the area of the back of the animal, and which area is located in front of the tail head and narrow enough to not include the hip or pin bones of the animal.

13. The arrangement of claim 1, wherein:

said image processing device is further provided for processing the three-dimensional image prior to forming the three-dimensional surface representation;

said processing of the three-dimensional image comprises filtering of the three-dimensional image; and said filtering comprises removing image data points depending on at least one of an intensity value, or distance information associated with the image data points.

14. The arrangement of claim 13, wherein said processing of the three-dimensional image comprises segmenting the three-dimensional image.

15. The arrangement of claim 1, wherein said three-dimensional camera system is a time-of-flight range camera or an active wavefront sampling camera.

16. The arrangement of claim 1, wherein the three-dimensional camera system is located above and behind the animal, and is directed downwards and forward, towards the back of the animal, to provide image information regarding the dorsal and posterior portions of the animal.

17. The arrangement of claim 1, wherein the three-dimensional camera system is located at a side of the animal and above the animal, and is directed sideways and downwards, to provide a lateral/dorsal image of the animal showing the area between the pin bones and the hook bones.

18. An animal feeding, milking, or resting station provided with the animal identification device and the arrangement of claim 1.

19. An animal arrangement comprising a herd management system and the arrangement of claim 1 operatively connected to the herd management system and provided to supply the herd management system with the determined body condition score of the animal.

20. A method for determining a body condition score of an animal, comprising:

directing a three-dimensional camera system towards the animal and recording at least one three-dimensional image of the animal;

forming a three-dimensional surface representation of a portion of the animal from the three-dimensional image recorded by the three-dimensional camera system;

statistically analyzing the surface of the three-dimensional surface representation;

determining the body condition score of the animal based on the statistically analyzed surface of the three-dimensional surface representation, wherein the statistical analyzing includes calculating statistical properties of a histogram that compares how measurement data may vary over the surface of the three-dimensional surface representation, and wherein the statistical properties comprise at least one of mean value, standard deviation, smoothness, skewness, uniformity, entropy, the width of the histogram, the width at the half maximum value, or parameters of a curve fitted to the histogram;

searching, prior to normalizing the three-dimensional surface representation, for reference points in the three-dimensional surface representation of the portion of the animal serving as control points for the normalization, said reference points including the spinal ridge and the in or hook bones of the animal in the three-dimensional surface representation; and normalizing the three-dimensional surface representation of the portion of the animal by rotation, translation, and scaling based on the location of the reference points such that the spinal ridge is essentially parallel with a first axis of a Cartesian coordinate system, a connection line between the tips of the in or hook bones is essentially parallel with a first axis of a Cartesian coordinate system, and the scaling of the three-dimensional surface representation is made depending on the distance between the tips of the in or hook bones.

21. The method of claim 20, wherein the at least one three-dimensional image of the animal comprises a two-dimensional image of the animal and, for each pixel of the two-dimensional image, the three-dimensional image further includes a distance value reflecting a distance between the three-dimensional camera system and an object image point on the animal.

22. An arrangement for determining a body condition score of an animal comprising:

a three-dimensional camera system provided for being directed towards the animal and for recording at least one three-dimensional image of a portion of the animal; and an image processing device connected to the three-dimensional camera system and provided for:
  forming a three-dimensional surface representation from the three-dimensional image;
  statistically analyzing the surface of the three-dimensional surface representation;
  determining the body condition score of the animal based on the statistically analyzed surface of the normalized three-dimensional surface representation,
  wherein the statistical analyzing includes calculating statistical properties of a histogram that compares how measurement data may vary over the surface of the three-dimensional surface representation, and
  wherein the statistical properties comprise at least one of mean value, standard deviation, smoothness, skewness, uniformity, entropy, the width of the histogram, the width at the half maximum value, or parameters of a curve fitted to the histogram;
  searching, prior to normalizing the three-dimensional surface representation, for reference points in the three-dimensional surface representation of the portion of the animal serving as control points for the normalization, said reference points including the spinal ridge and the in or hook bones of the animal in the three-dimensional surface representation; and
  normalizing the three-dimensional surface representation of the portion of the animal by rotation, translation, and scaling based on the location of the reference points such that the spinal ridge is essentially parallel with a first axis of a Cartesian coordinate system, a connection line between the tips of the in or hook bones is essentially parallel with a first axis of a Cartesian coordinate system, and the scaling of the three-dimensional surface representation is made depending on the distance between the tips of the in or hook bones.

23. A method for determining a body condition score of an animal, comprising:

directing a three-dimensional camera system towards the animal and recording at least one three-dimensional image of a portion of the animal;

forming a three-dimensional surface representation from the three-dimensional image;

statistically analyzing a surface of the three-dimensional surface representation by calculating statistical properties of a histogram that compares how measurement data may vary over the surface of the three-dimensional surface representation;

determining the body condition score of the animal based on the statistically analyzed surface of the normalized three-dimensional surface representation, wherein the statistical properties comprise at least one of mean value, standard deviation, smoothness, skewness, uniformity, entropy, the width of the histogram, the width at the half maximum value, or parameters of a curve fitted to the histogram;

searching, prior to normalizing the three-dimensional surface representation, for reference points in the three-dimensional surface representation of the portion of the animal serving as control points for the normalization, said reference points including the spinal ridge and the in or hook bones of the animal in the three-dimensional surface representation; and normalizing the three-dimensional surface representation of the portion of the animal by rotation, translation, and scaling based on the location of the reference points such that the spinal ridge is essentially parallel with a first axis of a Cartesian coordinate system, a connection line between the tips of the in or hook bones is essentially parallel with a first axis of a Cartesian coordinate system, and the scaling of the three-dimensional surface representation is made depending on the distance between the tips of the in or hook bones.

24. An arrangement for determining a body condition score of an animal, comprising:

a three-dimensional camera system provided for being directed towards the animal and for recording at least one three-dimensional image of a portion of the animal; and an image processing device connected to the three-dimensional camera system and provided for:
  forming a three-dimensional surface representation from the three-dimensional image;
  recognizing anatomical features in said three-dimensional surface representation;
  statistically analyzing a surface of the three-dimensional surface representation by calculating statistical properties of a histogram that compares how measurement data may vary over the surface of the three-dimensional surface representation;
  determining the body condition score of the animal based on the statistically analyzed surface of the three-dimensional surface representation,
  wherein the statistical properties comprise at least one of mean value, standard deviation, smoothness, skewness, uniformity, entropy, the width of the histogram, the width at the half maximum value, or parameters of a curve fitted to the histogram;

searching, prior to normalizing the three-dimensional surface representation, for reference points in the three-dimensional surface representation of the portion of the animal serving as control points for the normalization, said reference points including the spinal ridge and the in or hook bones of the animal in the three-dimensional surface representation; and normalizing the three-dimensional surface representation of the portion of the animal by rotation, translation, and scaling based on the location of the reference points such that the spinal ridge is essentially parallel with a first axis of a Cartesian coordinate system, a connection line between the tips of the in or hook bones is essentially parallel with a first axis of a Cartesian coordinate system, and the scaling of the three-dimensional surface representation is made depending on the distance between the tips of the in or hook bones.

25. A method for determining a body condition score of an animal, comprising:

directing a three-dimensional camera system towards the animal and recording at least one three-dimensional image of a portion of the animal;

forming a three-dimensional surface representation from the three-dimensional image;

recognizing anatomical features in said three-dimensional surface representation;

statistically analyzing a surface of the three-dimensional surface representation by calculating statistical properties of a histogram that compares how measurement data may vary over the surface of the three-dimensional surface representation;

determining the body condition score of the animal based on the statistically analyzed surface of the three-dimensional surface representation, wherein the statistical properties comprise at least one of mean value, standard deviation, smoothness, skewness, uniformity, entropy, the width of the histogram, the width at the half maximum value, or parameters of a curve fitted to the histogram;

searching, prior to normalizing the three-dimensional surface representation, for reference points in the three-dimensional surface representation of the portion of the animal serving as control points for the normalization, said reference points including the spinal ridge and the in or hook bones of the animal in the three-dimensional surface representation; and normalizing the three-dimensional surface representation of the portion of the animal by rotation, translation, and scaling based on the location of the reference points such that the spinal ridge is essentially parallel with a first axis of a Cartesian coordinate system, a connection line between the tips of the in or hook bones is essentially parallel with a first axis of a Cartesian coordinate system, and the scaling of the three-dimensional surface representation is made depending on the distance between the tips of the in or hook bones.

26. A method for managing animals using body condition score, comprising:

obtaining at least one three-dimensional image of the animal using a camera system;

forming a three-dimensional surface representation of at least a portion of the animal based on the three-dimensional image;

analyzing the three-dimensional surface representation to determine a body condition score for the animal representative of a fatness or thinness of the animal;

automatically triggering an alarm or an action to be taken with respect to the animal, based on the determined body condition score, wherein the analyzing includes calculating statistical properties of a histogram that compares how measurement data may vary over a surface of the three-dimensional surface representation, and wherein the statistical properties comprise at least one of mean value, standard deviation, smoothness, skewness, uniformity, entropy, the width of the histogram, the width at the half maximum value, or parameters of a curve fitted to the histogram;

searching, prior normalizing the three-dimensional surface representation, for reference points in the three-dimensional surface representation of the portion of the animal serving as control points for the normalization, said reference points including the spinal ridge and the in or hook bones of the animal in the three-dimensional surface representation; and normalizing the three-dimensional surface representation of the portion of the animal by rotation, translation, and scaling based on the location of the reference points such that the spinal ridge is essentially parallel with a first axis of a Cartesian coordinate system, a connection line between the tips of the in or hook bones is essentially parallel with a first axis of a Cartesian coordinate system, and the scaling of the three-dimensional surface representation is made depending on the distance between the tips of the in or hook bones.

27. An arrangement for managing animals using body condition score, comprising:

a three-dimensional camera system arranged to obtain at least one three-dimensional image of the animal; and an image processing device configured to:

form a three-dimensional surface representation of at least a portion of the animal based on the three-dimensional image;

analyze the three-dimensional surface representation to determine a body condition score for the animal representative of a fatness or thinness of the animal;

automatically trigger an alarm or an action to be taken with respect to the animal, based on the determined body condition score, wherein the analyzing includes calculating statistical properties of a histogram that compares how measurement data may vary over a surface of the three-dimensional surface representation, and wherein the statistical properties comprise at least one of mean value, standard deviation, smoothness, skewness, uniformity, entropy, the width of the histogram, the width at the half maximum value, or parameters of a curve fitted to the histogram;

search, prior to normalizing the three-dimensional surface representation, for reference points in the three-dimensional surface representation of the portion of the animal serving as control points for the normalization, said reference points including the spinal ridge and the in or hook bones of the animal in the three-dimensional surface representation; and normalize the three-dimensional surface representation of the portion of the animal by rotation, translation, and scaling based on the location of the reference points such that the spinal ridge is essentially parallel with a first axis of a Cartesian coordinate system, a connection line between the tips of the in or hook bones is essentially parallel with a first axis of a Cartesian coordinate system, and the scaling of the three-dimensional surface representation is made depending on the distance between the tips of the in or hook bones.

28. An arrangement for determining a body condition score of an animal, comprising:
   a three-dimensional camera system configured to be directed towards the animal and for recording at least one three-dimensional image of the animal; and
   an image processing device connected to the three-dimensional camera system and configured to:
      form a three-dimensional surface representation of a portion of the animal from the three-dimensional image recorded by the three-dimensional camera system,
         wherein the portion of the animal is a region of at least one of the back or loin of the animal, and
         wherein the portion of the animal has an area, which area is smaller than the area of the back of the animal, and which area is located in front of the tail head and narrow enough to not include the hip or pin bones of the animal;
      statistically analyze the surface of the three-dimensional surface representation;
      determine the body condition score of the animal based on the statistically analyzed surface of the three-dimensional surface representation,
         wherein the statistical analyzing includes calculating statistical properties of a histogram that compares how measurement data may vary over the surface of the three-dimensional surface representation, and
         wherein the statistical properties comprise at least one of mean value, standard deviation, smoothness, skewness, uniformity, entropy, the width of the histogram, the width at the half maximum value, or parameters of a curve fitted to the histogram;
      search, prior to normalizing the three-dimensional surface representation, for reference points in the three-dimensional surface representation of the portion of the animal serving as control points for the normalization, said reference points including the spinal ridge and the pin or hook bones of the animal in the three-dimensional surface representation; and
      normalize the three-dimensional surface representation of the portion of the animal by rotation, translation, and scaling based on the location of the reference points such that the spinal ridge is essentially parallel with a first axis of a Cartesian coordinate system, a connection line between the tips of the pin or hook bones is essentially parallel with a first axis of a Cartesian coordinate system, and the scaling of the three-dimensional surface representation is made depending on the distance between the tips of the pin or hook bones.

* * * * *

UNITED STATES PATENT AND TRADEMARK OFFICE
CERTIFICATE OF CORRECTION

PATENT NO. : 9,684,956 B2  
APPLICATION NO. : 13/132107  
DATED : June 20, 2017  
INVENTOR(S) : Bohao Liao et al.

Page 1 of 2

It is certified that error appears in the above-identified patent and that said Letters Patent is hereby corrected as shown below:

In the Claims

Claim 20, Column 17, Line 13, "in or" should read as --pin or--.

Claim 20, Column 17, Line 20, "in or" should read as --pin or--.

Claim 20, Column 17, Line 24, "in or" should read as --pin or--.

Claim 22, Column 17, Line 62, "in or" should read as --pin or--.

Claim 22, Column 18, Line 3, "in or" should read as --pin or--.

Claim 22, Column 18, Line 7, "in or" should read as --pin or--.

Claim 23, Column 18, Line 33, "in or" should read as --pin or--.

Claim 23, Column 18, Line 40, "in or" should read as --pin or--.

Claim 23, Column 18, Line 44, "in or" should read as --pin or--.

Claim 24, Column 19, Line 8, "in or" should read as --pin or--.

Claim 24, Column 19, Line 16, "in or" should read as --pin or--.

Claim 24, Column 19, Line 20, "in or" should read as --pin or--.

Claim 25, Column 19, Line 48, "in or" should read as --pin or--.

Claim 25, Column 19, Line 56, "in or" should read as --pin or--.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,684,956 B2

Claim 25, Column 19, Line 60, "in or" should read as --pin or--.

Claim 26, Column 20, Line 21, "in or" should read as --pin or--.

Claim 26, Column 20, Line 29, "in or" should read as --pin or--.

Claim 26, Column 20, Line 33, "in or" should read as --pin or--.

Claim 27, Column 20, Line 62, "in or" should read as --pin or--.

Claim 27, Column 21, Line 2, "in or" should read as --pin or--.

Claim 27, Column 21, Line 6, "in or" should read as --pin or--.